Feb. 29, 1944.  H. M. BICKLE  2,343,168
DIPSTICK GAUGE
Filed April 3, 1943
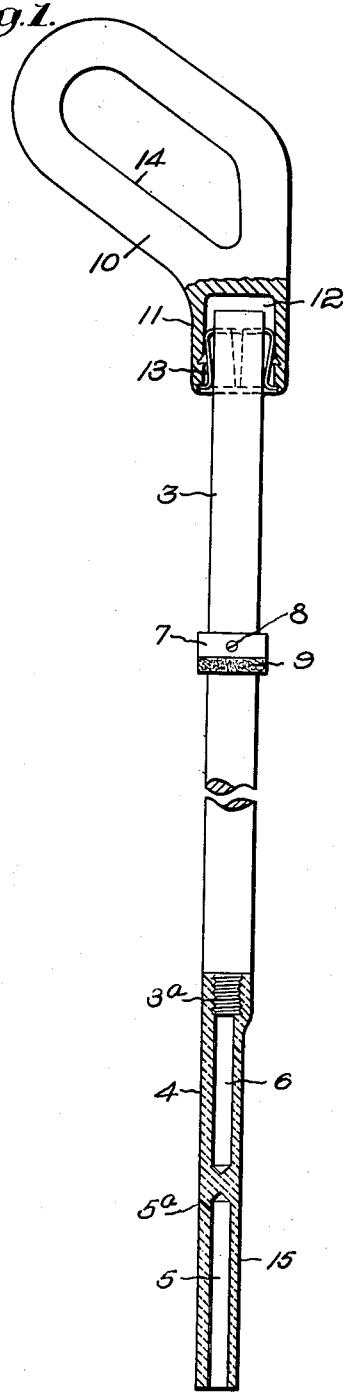
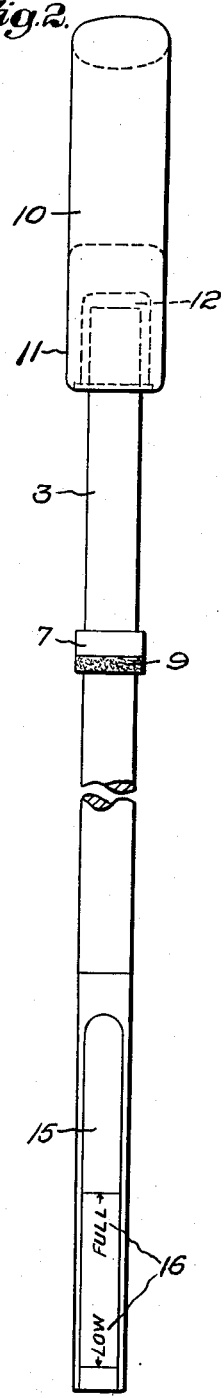
Inventor:
Harry Milman Bickle.
by Emery, Booth, Townsend, Miller & Weidner
Attys Patented Feb. 29, 1944

2,343,168

UNITED STATES PATENT OFFICE 2,343,168

DIP-STICK GAUGE

Harry Milman Bickle, Heston, England, assignor to Fram Corporation, East Providence, R. I., a corporation of Rhode Island Application April 3, 1943, Serial No. 481,680
In Great Britain March 2, 1942

8 Claims. (Cl. 88—14)

This invention relates to dipsticks or gauges as customarily used in connection with internal combustion engines to indicate the amount or level of the lubricating oil in the engine crackcase or sump. More particularly it aims to provide such device with improved means which allows the degree of contamination of the oil in the crankcase to be ascertained readily by comparing it with a standard color, and which thus indicates in a simple manner when it is necessary to take corrective action, as by replacing the contaminated oil with clean oil or, when a filtering device is incorporated in the lubricating system, cleaning the filter or replacing the filtering element or elements thereof.

In the accompanying drawing illustrating by way of example one embodiment of the invention:

Fig. 1 is an elevational view of the device as a whole, with portions in section; and Fig. 2 is an elevation of the device of Fig. 1 with the same turned 90°.

Referring to the drawing in more detail, the improved gauge or so-called dipstick as there shown comprises an elongated body portion which in this instance is substantially cylindrical and is formed in two parts 3 and 4. The upper part 3 of the body portion is in the form of a rod of steel or other material having a reduced threaded portion 3a at its lower end. The lower or leading part 4 of the body portion is made of a transparent synthetic resin or of other suitable transparent material and as shown has axially aligned portions or bores extending from each of its ends to form a lower crankcase oil-retaining chamber 5 and a separate upper chamber 6 for comparative purposes to be explained. The inner wall of the upper chamber 6 is tapped for a distance from its outer end adequate to provide a threaded socket for the reception of the threaded lower end portion 3a of the upper body part 3.

Prior to connecting the two parts of the dipstick body portion, the upper chamber 6 is supplied with a substance which is to serve as a standard for comparison with the oil or other liquid to be collected into the lower or sampling chamber 5 or upon the surface of the lower body portion 4. Such substance may be a comparative liquid or other means such for example as comminuted solid material or if preferred a suitably colored sheet material. After positioning of the standard or comparative substance in the upper chamber, the two parts 3 and 4 of the body portion are joined together as by the socket and threaded arrangement illustrated which at the same time serves to close the upper chamber. If preferred said upper chamber 6 instead of being filled at its upper end and closed by the lower end of the upper body part 3 of the dipstick, may be entirely closed except for a small filling aperture at any convenient location and which is sealed off after the chamber has been filled or supplied with its comparative material. In some instances a second comparative chamber may be provided, the two comparative chambers being filled with liquids of such different colors as to afford a finer or more detailed indication of the condition of the chamber fluid such as oil from an engine crankcase.

The upper part 3 of the body portion of the dipstick desirably is provided with a stop collar 7 which is preferably adjustably secured as by means of a set screw 8, whereby the depth to which the dipstick may be inserted into the crankcase may be determined as desired. The adjustable collar 7 may have a felt washer or the like 9 secured at its underface for sealing purposes.

The dipstick is provided at its upper end with a handle portion of "Bakelite" or other suitable material, and may be integrally or otherwise formed. As here illustrated, such handle comprises a pistol-grip portion 10 and an angularly related attaching portion 11 having a socket 12 adapted to receive and be affixed to the upper end of the upper body part 3 of the dipstick. Any suitable securing means may be provided for the handle such as threading or the like or a spear clip or fastener as indicated at 13. The handle portion desirably is formed with one or more flat surfaces as at 14, Fig. 1, on which any desired indicia can be incorporated.

The lower part 4 of the body portion of the dipstick preferably has a plane outer surface portion as at 15, this desirably extending substantially the length of the two or more chambers therein. Such plane outer surface portion facilitates comparison between the liquid in the lower chamber and on the plane surface with the comparative substance of the upper chamber or chambers. Such surface portion 15 also may have inscribed or otherwise applied on it suitable quantity indicia as at 16, Fig. 2, to show the level of the oil in the crankcase.

It is important that the oil in the crankcase to be tested should be able to circulate into the lower chamber 5 of the dipstick, so that the oil retained in this lower chamber on withdrawal of the dipstick from the crankcase is rightly representative of the oil in the crankcase. The desired circulation of the oil may be achieved by forming the lower chamber 5 of relatively large cross-sectional area or preferably by making the bore of this lower chamber 5 of a relatively small or even capillary dimension and providing the upper part of the chamber with a vent hole or relieving aperture as indicated at 5a, Fig. 1.

In use, the dipstick is withdrawn from the crankcase, brought to a substantially horizontal position and the depth of oil adhering to the outer surface of the dipstick noted, and thus the amount of oil in the crankcase determined. The oil on the outside of the dipstick is then removed, when the oil contained in the lower chamber 5 can be compared with the oil or other liquid contained in the upper chamber 6, and a visual and comparative determination of the state of the oil in the engine crankcase readily made.

From the foregoing it will be evident that the improved dipstick according to the present invention comprises an elongated body portion having therein at its lower end a chamber such as 5 opening to the outside of the body portion and adapted, when the dipstick is removed from the engine crankcase, to retain therein at least some of the oil removed from the crankcase and contained in said chamber, and further comprises comparative means enclosed within the dipstick body portion against contamination by oil in the crankcase, and providing a standard color with which the color of the oil retained in the said chamber may be compared. The said comparative means preferably comprises a further chamber or chambers in the body portion of the dipstick containing a standard or comparative liquid or other substance, for example, clean lubricating oil or oil having a predetermined amount of contamination.

My invention is not limited to the exemplary embodiment herein illustrated or described, its scope being set forth in the following claims:

1. An oil gauge of the dipstick type for insertion and support at an orifice admitting to an oil supply to be tested, said gauge comprising an elongated body portion having a lower end for immersion in the oil, an oil-receiving chamber at the lower end of and opening to the outside of the body portion, a further and closed chamber within the body portion adjacent said open chamber, and comparative means in said closed chamber affording a standard for visual comparison therewith of the oil of the lower chamber, said chambers having transparent wall portions rendering their contents simultaneously viewable.

2. A dipstick in accordance with claim 1 including in combination therewith a detachable pistol-grip handle portion at the upper end of the elongated body portion.

3. A dipstick in accordance with claim 1 wherein the lower chambered part of the elongated body portion has a plane surface facilitating comparison between the contents of the chambers and adapted for displaying indicia.

4. A dipstick in accordance with claim 1 wherein the lower oil-receiving chamber is of relatively small dimension and the chamber is formed with a vent hole at an upper level thereof.

5. A dipstick in accordance with claim 1 including in combination a collar-like positioning stop adjustably secured at an upper part of the dipstick body portion.

6. A dipstick in accordance with claim 1 wherein the elongated body portion comprises separable lower and upper parts adapted to be detachably intersecured.

7. An oil gauge or inspection device of the dipstick type comprising an elongated body portion having separable lower and upper parts, the lower part of said body portion having an oil-receiving chamber at its lower end and opening at the bottom thereof, said lower part also having a comparative chamber formed in and opening downwardly from its upper end said upper end having its inner wall threaded at the mouth of said chamber, and the upper part of the dipstick body having a threaded lower end for reception in said threaded portion of the lower part thereby to secure together the two parts and to close the comparative chamber, means in the closed chamber affording a standard for visual comparison therewith of the oil of the lower chamber, said chambers having transparent wall portions, rendering their contents simultaneously viewable.

8. An oil-inspecting dipstick adapted to be inserted and withdrawably supported at an orifice admitting to an oil supply to be examined, said dipstick comprising an elongated body portion having therein at its lower end a chamber provided with an oil inlet opening to the outside of the body portion, said chamber adapted on withdrawal of the dipstick to retain at least some of the oil received therein prior to such withdrawal, and comparative means carried by said body portion and covered against contamination by oil from the supply, said means providing a visual standard with which the oil retained in said chamber may be compared.

HARRY MILMAN BICKLE.